United States Patent [19]
Azechi et al.

[11] Patent Number: 5,271,868
[45] Date of Patent: Dec. 21, 1993

[54] POLYOXYALKYLENE-MODIFIED POLYDIMETHYLSILOXANE ANTIFOAM COMPOSITIONS WITH TWO DIFFERENT POLYOXYALKYLENE GROUPS

[75] Inventors: Syuichi Azechi; Kunihiro Yamada; Hiroshi Ohashi; Nobuyuki Terae; Satoshi Kuwata, all of Gunma, Japan

[73] Assignee: Shin-Etsu Chemical Co., Ltd., Tokyo, Japan

[21] Appl. No.: 813,704

[22] Filed: Dec. 27, 1991

[30] Foreign Application Priority Data

Dec. 27, 1990 [JP] Japan .................. 2-414678

[51] Int. Cl.$^5$ .................. B01D 17/00; B01D 19/04
[52] U.S. Cl. .................. 252/358; 252/321; 252/8.9
[58] Field of Search .............. 252/309, 321, 358, 8.9; 8/581

[56] References Cited

U.S. PATENT DOCUMENTS

| | | | |
|---|---|---|---|
| 3,233,986 | 2/1966 | Morehouse | 252/358 X |
| 4,468,491 | 8/1984 | Steinberger et al. | 524/493 |
| 4,504,410 | 3/1985 | Hempel et al. | 252/358 |
| 4,514,319 | 4/1985 | Kulkarni et al. | 252/321 |
| 4,584,125 | 4/1986 | Griswold et al. | 252/358 |
| 4,597,894 | 7/1986 | Abe et al. | 252/358 |
| 4,690,688 | 9/1987 | Adams et al. | 44/76 |
| 4,690,713 | 9/1987 | Terae et al. | 106/287.16 |
| 4,804,737 | 2/1989 | Berger et al. | 528/26 |
| 4,900,474 | 2/1990 | Terae et al. | 252/358 |
| 4,961,877 | 10/1990 | Shimizu et al. | 252/358 |
| 5,004,559 | 4/1991 | Koerner et al. | 252/358 X |
| 5,080,828 | 1/1992 | Terae | 252/358 |
| 5,106,535 | 4/1992 | Mutoh et al. | 252/358 |

*Primary Examiner*—Robert L. Stoll
*Assistant Examiner*—Daniel S. Metzmaier
*Attorney, Agent, or Firm*—Millen, White, Zelano, & Branigan

[57] ABSTRACT

Disclosed is a silicone-based antifoam composition capable of exhibiting high defoaming activity even at a high temperature with excellent durability so as to be useful in dyeing processes. The composition comprises, as the principal ingredient, a polyoxyalkylene-modified polydimethylsiloxane, of which, different from conventional polyoxyalkylene-modified polydimethylsiloxanes, the polyoxyalkylene groups consist of two different types relative to the molar proportion of the oxyethylene units and oxypropylene units, in addition to a silicone oil compound of a silica filler, a poly(oxyethylene-oxypropylene) copolymer and low-molecular polydimethylsiloxane terminated at each molecular chain end with a dimethyl hydroxy silyl group.

14 Claims, No Drawings

POLYOXYALKYLENE-MODIFIED POLYDIMETHYLSILOXANE ANTIFOAM COMPOSITIONS WITH TWO DIFFERENT POLYOXYALKYLENE GROUPS

BACKGROUND OF THE INVENTION

The present invention relates to a silicone-based antifoam composition or, more particularly, to a silicone-based antifoam composition having excellent stability against dilution and durability of the antifoam activity so as to be useful for foaming suppression in the industrial dyeing process, especially, at high temperatures without causing troubles of uneven dyeing.

Various types of antifoam compositions are known in the prior art and used for suppressing foaming and destroying foams, among which silicone-based antifoam compositions containing a dimethylpolysiloxane as the principal ingredient are most widely used in various processes in which suppression of foaming is of essential importance including various chemical industries, dyeing industries and the like by virtue of their excellent performance as compared with antifoam compositions of other types.

Since dimethylpolysiloxanes are inherently hydrophobic and hardly dispersible as such in water, silicone-based antifoam compositions are used usually in the form of an aqueous emulsion prepared by emulsifying a dimethylpolysiloxane in water using a surface active agent. A problem in such an emulsion-type silicone-based antifoam composition is that the emulsion is relatively unstable and sometimes destroyed in use especially when the foaming bath to be subjected to an antifoam treatment is at a high temperature or under a strong shearing force, for example, with vigorous agitation resulting in complete loss of the desired antifoam effect or rather in eventual promotion of foaming of the bath. The emulsions are also not quite stable in storage so that the dimethylpolysiloxane may be separated from the emulsion during prolonged storage so that use of such a degraded emulsion-type silicone-based antifoam composition in the dyeing process sometimes causes a trouble of uneven dyeing or occurrence of oil spots on the dyed products due to the water-repellency of the separated dimethylpolysiloxane.

Various attempts and proposals, of course, have been made to solve the above mentioned problems in silicone-based antifoam compositions. For example, U.S. Pat. No. 3,233,986 proposes use of an organopolysiloxane modified with polyoxyalkylene groups as the principal ingredient. An antifoam composition prepared by emulsifying such a polyoxyalkylene-modified organopolysiloxane in water, however, is not suitable for practical use owing to the relatively low effectiveness for destroying of foams and suppression of foaming. It is reported in Japanese Patent Publications 52-19836, 52-22638 and 55-23084 that the antifoam activity of an antifoam composition based on such a hydrophilic polyoxyalkylene-modified dimethylpolysiloxane can be improved when this base ingredient is combined with an oil compound composed of an unmodified organopolysiloxane, e.g., dimethylpolysiloxane, and a finely divided silica powder. Further, Japanese Patent Publication 58-58126 proposes use of an organopolysiloxane co-modified with long-chain alkyl groups and polyoxyalkylene groups as the base ingredient of an antifoam composition.

These silicone-based antifoam compositions after the above mentioned proposal for improvement are still unsatisfactory when they are used in the modern dyeing industry in which the dyeing bath is at a high temperature and sometimes under very strong mechanical shearing forces to destroy the emulsion of the organopolysiloxane which is coagulated into oil drops so as to cause serious troubles of uneven dyeing or stain of the dyed material with oil spots.

In view of the above mentioned problems relative to the silicone-based antifoam compositions used in industrial dyeing processes conducted, usually, at high temperatures, a further proposal has been made for preventing coagulation of the organopolysiloxane in an aqueous emulsion at high temperatures, according to which the antifoam composition is prepared from a polyoxyalkylene-modified organopolysiloxane of which the molar fraction of the oxyethylene units relative to the oxypropylene units is increased in the overall oxyalkylene units. The use of such a polyoxyalkylene-modified organopolysiloxane of an increased molar fraction of the oxyethylene units, however, is accompanied by several disadvantages that the dispersibility of the oil compound composed of a dimethylpolysiloxane and a finely divided silica powder is decreased and the stability of the emulsion is adversely affected by dilution, under mechanical shearing forces or at high temperatures so that such a silicone-based antifoam composition is not always suitable for practical use.

SUMMARY OF THE INVENTION

The present invention accordingly has an object to provide a novel and improved silicone-based antifoam composition free from the above described problems and disadvantages in the prior art silicone-based antifoam compositions.

Thus, the silicone-based antifoam composition of the present invention comprises, as a uniform blend:

(a) from 60 to 70 parts by weight of a polyoxyalkylene-modified diorganopolysiloxane represented by the general formula

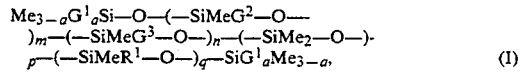
(I)

in which Me is a methyl group, $G^1$ is a group selected from the group consisting of a methyl, $R^1$, $G^2$ and $G^3$ groups, $G^2$ and $G^3$ are each a polyoxyalkylene group having a molecular weight of 500 to 3000 and represented by the general formula

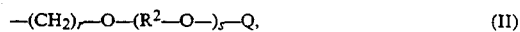
(II)

$R^2$ being a combination of ethylene units and propylene units with the proviso that the molar fraction of ethylene units in the overall $R^2$ units is from 10 to 30% in $G^2$ and from 65 to 85% in $G^3$ with the balance of propylene units, Q being a hydrogen atom or a monovalent organic group selected from the group consisting of alkyl groups of 1 to 8 carbon atoms, acetyl group and isocyanato group, r being a positive integer of 2 to 6 and s being a positive integer of 5 to 50, $R^1$ is a monovalent hydrocarbon group having 3 to 20 carbon atoms, the subscript a is 0 or 1, the subscripts m and n are each a positive integer of 1 to 30, the subscript p is a positive integer of 10 to 100 and the subscript q is a positive integer of 1 to 10 with the proviso that the molar ratio of $G^2:G^3$ is in the range from 0.3:1 to 3.0:1;

(b) from 10 to 20 parts by weight of an oil compound consisting of from 85 to 95% by weight of (b-1) a polydimethylsiloxane having a viscosity of 10 to 100,000 centistokes at 25° C. and from 15 to 5% by weight of (b-2) a finely divided silica powder;

(c) from 10 to 20 parts by weight of a poly(oxyethylene-oxypropylene) copolymer having an average molecular weight in the range from 500 to 3000, of which the molar fraction of the oxyethylene units is in the range from 10 to 85%; and (d) from 5 to 15 parts by weight of a polydimethylsiloxane having a viscosity of 10 to 500 centistokes at 25° C. and terminated at each molecular chain end with a dimethyl hydroxy silyl group, the total amount of the components (a), (b), (c) and (d) being 100 parts by weight.

DETAILED DESCRIPTION OF THE PREFERRED EMBODIMENTS

As is described above, the essential ingredients in the silicone-based antifoam composition of the invention include the above defined components (a) to (d), of which the most characteristic is the component (a). This component (a) is a polyoxyalkylene-modified diorganopolysiloxane which is, different from conventional polyoxyalkylene-modified diorganopolysiloxanes in the prior art, modified characteristically with two different kinds of polyoxyalkylene groups denoted by the symbols $G^2$ and $G^3$ in the general formula (I). When such a polyoxyalkylene-modified diorganopolysiloxane is compounded with the other components each in a specified proportion to prepare an antifoam composition, a very strong foaming-suppressing effect with excellent durability can be obtained by the addition of a small amount of the composition to an aqueous foaming liquid. Furthermore, the antifoam activity is very stable even at high temperatures or under high shearing force and not decreased by dilution so that the antifoam composition can be used advantageously in the dyeing process without causing the troubles of uneven dyeing or appearance of oil spots.

The component (a) is a polyoxyalkylene-modified diorganopolysiloxane represented by the general formula

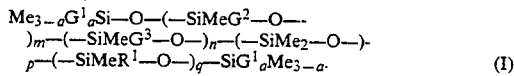

$$\text{Me}_{3-a}G^1{}_a\text{Si}-\text{O}-(-\text{SiMeG}^2-\text{O}-)_m-(-\text{SiMeG}^3-\text{O}-)_n-(-\text{SiMe}_2-\text{O}-)_p-(-\text{SiMeR}^1-\text{O}-)_q-\text{SiG}^1{}_a\text{Me}_{3-a}. \quad (I)$$

In the formula, Me is a methyl group, $G^1$ is a group selected from the group consisting of a methyl, $R^1$, $G^2$ and $G^3$ groups, $G^2$ and $G^3$ are each a polyoxyalkylene group having a molecular weight of 500 to 3000 or, preferably, 1000 to 2000 and represented by the general formula

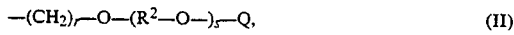

$$-(\text{CH}_2)_r-\text{O}-(\text{R}^2-\text{O}-)_s-\text{Q}, \quad (II)$$

in which $R^2$ is a combination of ethylene units and propylene units with the proviso that the molar fraction of ethylene units in the overall $R^2$ units is from 10 to 30% in $G^2$ and from 65 to 85% in $G^3$, the balance being propylene units, Q is a hydrogen atom or a monovalent organic group selected from the group consisting of alkyl groups of 1 to 8 carbon atoms, acetyl group and isocyanato group, r is a positive integer of 2 to 6 or, preferably, 2 or 3 and s is a positive integer of 5 to 50 or, preferably, 15 to 45, $R^1$ is a monovalent hydrocarbon group having 3 to 20 carbon atoms, the subscript a is 0 or 1, the subscripts m and n are each a positive integer of 1 to 30, the subscript p is a positive integer of 10 to 100 and the subscript q is a positive integer of 1 to 10. When the molecular weight of the polyoxyalkylene groups $G^2$ or $G^3$ is too small, the diorganopolysiloxane as the component (a) cannot be imparted with high hydrophilicity while, when the molecular weight thereof is too large, the viscosity of the diorganopolysiloxane as the component (a) would be too high to be rapidly dispersible in the foaming liquid causing inconvenience in working. It is preferable that the molar ratio of the polyoxyalkylene groups $G^2:G^3$ is in the range from 0.3:1 to 3.0:1. When $G^1$ is $G^2$ or $G^3$, the calculation of this molar ratio should of course be made by taking $G^1$ into calculation. When the molar ratio of $G^2:G^3$ is too small, the dispersibility of the diorganopolysiloxane as the component (a) is adversely influenced while, when the molar ratio is too large, the antifoam activity of the antifoam composition would be decreased.

The group denoted by Q in the above given general formula (II) representing the polyoxyalkylene group is a hydrogen atom or a monovalent organic group selected from the group consisting of alkyl groups having 1 to 8 carbon atoms such as methyl, ethyl, propyl, butyl and hexyl groups, acetyl group and isocyanato group of the formula —NCO. $R^1$ in the general formula (I) is a monovalent hydrocarbon group having 3 to 20 carbon atoms. When the number of carbon atoms in $R^1$ is larger than 20, the dispersibility of the diorganopolysiloxane as the component (a) is unduly decreased and the antifoam activity of the composition is decreased. The subscripts m and n in the general formula (I) are each a positive integer of 1 to 30 with the proviso that m+n is in the range from 3 to 40 or, preferably, from 3 to 20. The subscript p is a positive integer in the range from 10 to 100 or, preferably, from 20 to 60. When the value of p is too small, the viscosity of the component (a) is unduly decreased so that the antifoam composition would be somewhat unstable in storage to cause separation of the component (a) while, when the value of p is too large, the viscosity of the component (a) would be so high that the dispersibility thereof is greatly decreased resulting in poor workability. The subscript q in the general formula (I) is a positive integer not exceeding 20. These subscripts should preferably have such values that the weight proportion of the siloxane moiety in the component (a) is in the range from 5 to 20% or, in other words, the component (a) consists of from 5 to 20% by weight of the siloxane moiety and from 95 to 80% by weight of the polyoxyalkylene moiety corresponding to $G^2$, $G^3$ and $G^1$, when $G^1$ is $G^2$ or $G^3$.

The polyoxyalkylene-modified diorganopolysiloxane as the component (a) can be prepared by a known method involving the addition reaction of so-called hydrosilation. For example, a methyl hydrogen polysiloxane having hydrogen atoms directly bonded to the silicon atoms is subjected to the hydrosilation reaction with two kinds of different polyoxyalkylene compounds having a vinyl or allyl group at a molecular chain end corresponding to the groups $G^2$ and $G^3$ and an α-olefin compound having 3 to 20 carbon atoms in a molecule corresponding to the group denoted by $R^1$ in the presence of a catalytic amount of a platinum compound. Alternatively, an α-olefin compound having 3 to 20 carbon atoms in a molecule is first reacted with a methyl hydrogen polysiloxane to introduce the groups $R^1$ thereinto and then the $R^1$-containing methyl hydrogen polysiloxane is reacted with two kinds of polyoxyalkylene compounds to introduce the polyoxyalkylene groups $G^2$ and $G^3$.

The amount of the polyoxyalkylene-modified diorganopolysiloxane as the component (a) in the inventive antifoam composition is in the range from 60 to 70 parts by weight assuming that the total amount of the components (a) to (d) is 100 parts by weight. When the amount of the component (a) is too small, the composition is poorly dispersible in aqueous foaming liquids. When the amount thereof is too large, on the other hand, certain difficulties are encountered in the preparation of the composition which should be dispersed in the form of an aqueous emulsion in use due to a decrease in the self-emulsifiability.

The component (b) in the inventive antifoam composition is an oil compound consisting of (b-1) a polydimethylsiloxane fluid or so-called dimethyl silicone oil and (b-2) a finely divided silica powder. The dimethyl silicone oil is a polydimethylsiloxane having a linear molecular structure although a small number of branches in the molecule may have no particularly adverse influence. The terminal group at the molecular chain end is preferably a trimethylsilyl group. The dimethyl silicone oil should have a viscosity in the range from 10 to 100,000 centistokes or, preferably, from 100 to 5000 centistokes at 25° C. in view of the balance between the dispersibility and workability, for which the viscosity should be as low as possible, and durability in the antifoam activity, for which the viscosity should be as high as possible. When the viscosity of the dimethyl silicone oil is too low, the stability of the composition in the form of an aqueous emulsion is decreased. When the viscosity thereof is too high, the workability with the antifoam composition would be decreased.

The finely divided silica powder compounded with the above described dimethyl silicone oil is a well known material and any of wet-process and dry-process silica fillers can be used without particular limitations although it is preferable that the silica powder has a specific surface area of at least 100 m$^2$/g as determined by the BET method. Various commercial grades of precipitated silica fillers, silica xerogels and fumed silica fillers as well as those after a hydrophobic treatment with an organosilicon compound are available on the market including Aerosils (products by Nippon Aerosil Co.), Nipsils (products by Nippon Silica Co.), Cab-O-Sils (products by Cabot Corp.), Santocels (products by Monsanto Chemical Co.) and the like.

The oil compound as the component (b) is prepared from 85 to 95% by weight of the dimethyl silicone oil and from 15 to 5% by weight of the finely divided silica powder. When the weight proportion of the dimethyl silicone oil is too large, the composition comprising the oil compound cannot exhibit full antifoam activity. When the weight proportion of the silica powder is too large, dispersibility of the composition would be unduly decreased due to increase in the consistency. The amount of the oil compound as the component (b) in the inventive antifoam composition is in the range from 10 to 20 parts by weight per 100 parts by weight of the total amount of the components (a) to (d). The antifoam activity of the composition would be decreased when the amount of the component (b) is too small while the consistency of the composition would be too high to cause a decrease in the workability when the amount of the component (b) is too large.

The component (c) in the inventive antifoam composition is a polyoxyalkylene compound which is a copolymer consisting of oxyethylene units and oxypropylene units and serves as an emulsification aid to promote emulsification of the above described components (a) and (b) and the component (d) described below in water to give a stable emulsion. The polyoxyalkylene compound should have an average molecular weight in the range from 500 to 3000 or, preferably, from 1500 to 2500. When the molecular weight thereof is too small, no full effect can be exhibited on the stabilization of the aqueous emulsion. When the molecular weight thereof is too large, on the other hand, the polyoxyalkylene compound has a viscosity too high to have good dispersibility in water. It is important that the polyoxyalkylene compound as the component (c) is a copolymer of from 10 to 85% by moles or, preferably, from 30 to 70% by moles of the oxyethylene units and from 15 to 90% by moles or, preferably, from 70 to 30% by moles of the oxypropylene units. When the molar fraction of the oxyethylene units is too small, the polyoxyalkylene compound would be too hydrophobic to satisafatorily act as an emulsification aid. When the molar fraction of the oxyethylene units is too large, on the other hand, the polyoxyalkylene compound would have a too large value of HLB to serve as an emulsification aid. The amount of the polyoxyalkylene compound as the component (c) in the inventive antifoam composition is in the range from 10 to 20 parts by weight per 100 parts by weight of the total amount of the components (a) to (d). When the amount thereof is too small, the aqueous emulsion of the composition would be poor in the storage stability while, when the amount thereof is too large, the aqueous emulsion of the composition would be somewhat unstable in dilution.

The component (d) in the inventive antifoam composition is a polydimethylsiloxane terminated at each molecular chain end with a silanolic hydroxy group or dimethyl hydroxy silyl group and serves as a "binder" between the components (a) and (b) by increasing the miscibility of these components. Namely, the interfacial tension between these components, inherently poorly miscible with each other, is decreased by the silanolic hydroxy groups. The hydroxy-terminated polydimethylsiloxane as the component (d) should have a viscosity in the range from 10 to 500 centistokes or, preferably, from 30 to 200 centistokes at 25° C. When the viscosity thereof is too low, the aqueous emulsion of the composition would be somewhat unstabe sometimes to cause a trouble due to oil spots in dyeing. When the viscosity thereof is too high, on the other hand, the above mentioned effect on the components (a) and (b) cannot be fully exhibited unless the amount of the component (d) is unduly increased. The amount of the hydroxy-terminated polydimethylsiloxane as the component (d) in the inventive antifoam composition is in the range from 5 to 15 parts by weight per 100 parts by weight of the total amount of the components (a) to (d). When the amount thereof is too small, the desired effect cannot be fully exhibited as a matter of course. When the amount thereof is too large, on the other hand, the composition would have an unduly low viscosity eventually causing settling of the finely divided silica powder.

The antifoam composition of the invention can be readily prepared by uniformly blending each a specified amount of the above described components (a) to (d)

using a suitable blending machine such as homomixers and the like. The order of blending of the respective components is not particularly limitative. It is sometimes advantageous that the blending work is performed under heating at a temperature in the range from 40° to 150° C.

In the following, the antifoam composition of the invention is illustrated in more detail by way of examples and comparative examples. The antifoam compositions prepared in the examples and comparative examples were evaluated for several items by the testing methods shown below.

STABILITY AGAINST DILUTION

A 100 g portion of a 10% by weight aqueous dispersion of the antifoam composition is taken in a 200 ml glass beaker and kept standing for 24 hours at 25° C. to be visually examined and rated according to the following criteria for the ratings of A, B, C and D.

A: stable emulsion, absolutely free from oil spots
B: very slight but noticeable oil spots or settling or floating of silica powder
C: noticeable oil spots or settling or floating of silica powder
D: separation of silicone oil into layers

DEFOAMING ACTIVITY

A 100 g portion of a 0.2% aqueous solution of sodium oleate is taken in a graduated measuring cylinder of 1000 ml capacity and the solution is admixed with 2.0 g of a 10% by weight aqueous dispersion of the antifoam composition. Air is blown at 25° C. into the solution through a fritted glass ball at the bottom at a rate of 1000 ml per minute for 20 minutes to cause rising of foams and the total volume of the liquid portion and the foam layer is recorded.

DYEING TEST

A polyester cloth weighing 10 g is dyed at 135° C. taking 10 minutes in an aqueous dyeing bath of 2 liters volume containing 0.1 g of a dye (S-BGU, a product by Hoechst Co.), 4 g of a surface active agent (Emal NC-35, a produce by Kao Co.), 4 g of acetic acid and 10 g of the antifoam composition under testing by using a high-temperature dyeing machine (Model JF, manufactured by Werner Mathis Co.) and evenness of dyeing is visually examined and rated according the following criteria for the ratings of A, B, C and D.

A: absolutely free from unevenness of dyeing
B: slight unevenness of dyeing but not greater than in blank test without addition of antifoam composition
C: noticeable darkened or pale spots found
D: unacceptable darkened or pale spots found

EXAMPLES 1 TO 4 AND COMPARATIVE EXAMPLES 1 TO 3.

An antifoam composition was prepared in each of these Examples 1 to 4 and Comparative Examples 1 to 3 by uniformly blending, in a homomixer, 650 g of (a) one of the polyoxyalkylene-modified diorganopolysiloxane oils A-1 to A-4 and B-1 to B-3, respectively, shown by the average structural formulas below, in which Me is a methyl group and Pr is a propyl group, with 15 g of (b) a silicone oil compound prepared by compounding 45% by weight of a first polydimethylsiloxane having a viscosity of 1150 centi-stokes at 25° C. and terminated at each molecular chain end with a trimethylsilyl group, 45% by weight of a second polydimethylsiloxane having a viscosity of 100 centistokes at 25° C. and terminated at each molecular chain end with a trimethylsilyl group and 10% by weight of a finely divided silica filler (Nipsil 9019, a product by Nippon Silica Co.), 150 g of (c) a poly(oxyethylene-oxypropylene) copolymer having a viscosity of 1250 centistokes at 25° C. and expressed by the structural formula

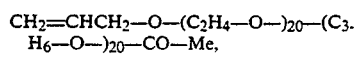

and 80 g of (d) a polydimethylsiloxane having a viscosity of 56 centistokes at 25° C. and terminated at each molecular chain end with a dimethyl hydroxy silyl group.

A-1: 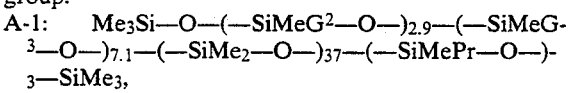

in which
G$^2$ is a group of the formula —(—CH$_2$—)$_3$—O—(C$_2$H$_4$O)$_{27}$—(C$_3$H$_6$O)$_9$—C$_4$H$_9$ and
G$^3$ is a group of the formula —(—CH$_2$—)$_3$—O—(C$_2$H$_4$O)$_6$—(C$_3$H$_6$O)$_{24}$—H.

A-2: 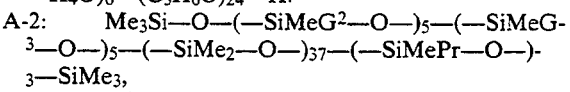

in which G$^2$ and G$^3$ each have the same meaning as above.

A-3: 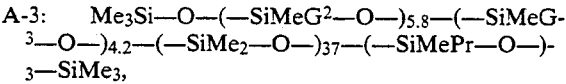

in which G$^2$ and G$^3$ each have the same meaning as above.

A-4: 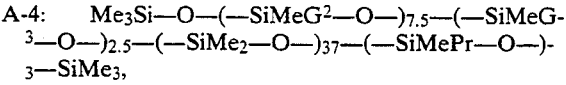

in which G$^2$ and G$^3$ each have the same meaning as above.

B-1: 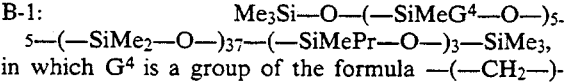

in which G$^4$ is a group of the formula —(—CH$_2$—)$_3$—O—(C$_2$H$_4$O)$_{20}$—(C$_3$H$_6$O)$_{20}$—CO—Me.

B-2: 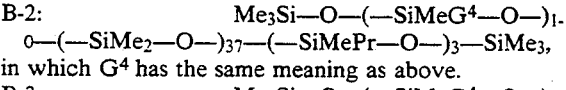

in which G$^4$ has the same meaning as above.

B-3: 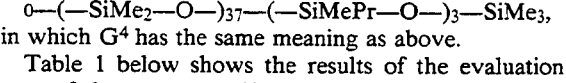

in which G$^4$ has the same meaning as above.

Table 1 below shows the results of the evaluation tests of these seven antifoam compositions undertaken according to the procedures described above.

TABLE 1

| Polyoxyalkylene-modified silicone oil | Stability against dilution | Defoaming activity test. ml | Dyeing test |
|---|---|---|---|
| A-1 | B | 155 | B |
| A-2 | A | 190 | B |
| A-3 | A | 165 | B |
| A-4 | A | 145 | B |
| B-1 | C | 165 | C |
| B-2 | C | 200 | B |
| B-3 | D | 190 | C |

What is claimed is:
1. A silicone-based antifoam composition comprising, as a uniform blend:

(a) 60-70 parts by weight of a polyoxyalkylene-modified diorganopolysiloxane represented by the formula

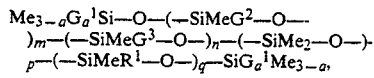

in which Me is methyl, $G^1$ is selected from the group consisting of a methyl, $R^1$, $G^2$ and $G^3$, $G^2$ and $G^3$ are each a polyoxyalkylene group having a molecular weight of 500-3000 and represented by the formula

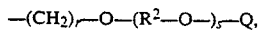

$R^2$ is a combination of ethylene units and propylene units with the proviso that the molar fraction of ethylene units in the overall $R^2$ units is 10-30% in $G^2$ and 65-85% in $G^3$ with the balance of propylene units, Q is a hydrogen atom or a monovalent organic group selected from the group consisting of alkyl of 1-8 carbon atoms, acetyl and isocyanato, subscript r is a positive integer of 2-6 and subscript s is a positive integer of 5-50, $R^1$ is a monovalent hydrocarbon group having 3-20 carbon atoms, subscript a is 0 or 1, subscripts m and n are each a positive integer of 1-30, subscript p is a positive integer of 10-100, and subscript q is a positive integer of 1-10, with the proviso that the molar ratio of $G^2$:$G^3$ is 0.3:1-3.0:1;

(b) 10-20 parts by weight of an oil compound consisting of 85-95% by weight of (b-1) a polydimethylsiloxane having a viscosity of 10-100,000 centistokes at 25° C. and 15-5% by weight of (b-2) a finely divided silica powder;

(c) 10-20 parts by weight of a poly(oxyethylene-oxypropylene) copolymer having an average molecular weight of 500-3000, of which the molar fraction of oxyethylene units is 10-85%; and (d) 5-15 parts by weight of a polydimethylsiloxane having a viscosity of 10-500 centistokes at 25° C.

and terminated at each molecular chain end with a dimethyl hydroxy silyl group;
the total amount of components (a), (b), (c) and (d) being 100 parts by weight.

2. A silicone-based antifoam composition according to claim 1, wherein said polydimethylsiloxane component (b-1) of said oil compound component (b) is terminated at each molecular chain end with a trimethyl silyl group.

3. A silicone-based antifoam composition according to claim 1, wherein said finely divided silica powder component (b-2) of said oil compound component (b) has a specific surface area of at least 100 m²/g.

4. A composition according to claim 1, wherein the molecular weight of polyoxyalkylene groups $G^2$ and $G^3$ in component (a) in each case is 1000-2000.

5. A composition according to claim 1, wherein subscript r of $G^2$ and $G^3$ is in each case independently 2 or 3.

6. A composition according to claim 1, wherein subscript s of $G^2$ and $G^3$ is in each case independently 15-45.

7. A composition according to claim 1, wherein m+n is 3-40.

8. A composition according to claim 1, wherein m+n is 3-20.

9. A composition according to claim 1, wherein p is 20-60.

10. A composition according to claim 1, wherein component (a) consists of 5-20 wt. % siloxane moiety and 80-95 wt. % polyoxyalkylene moiety.

11. A composition according to claim 1, wherein said (b-1) polydimethylsiloxane has a viscosity of 100-5000 centistokes at 25° C.

12. A composition according to claim 1, wherein said poly(oxyethylene-oxypropylene) copolymer of component (c) has an average molecular weight of 1500-2500.

13. A composition according to claim 1, wherein the molar fraction of oxyethylene units in component (c) is 30-70.

14. A composition according to claim 1, wherein said polydimethylsiloxane of component (d) has a viscosity of 30-200 centistokes at 25° C.

* * * * *